Patented Dec. 3, 1929

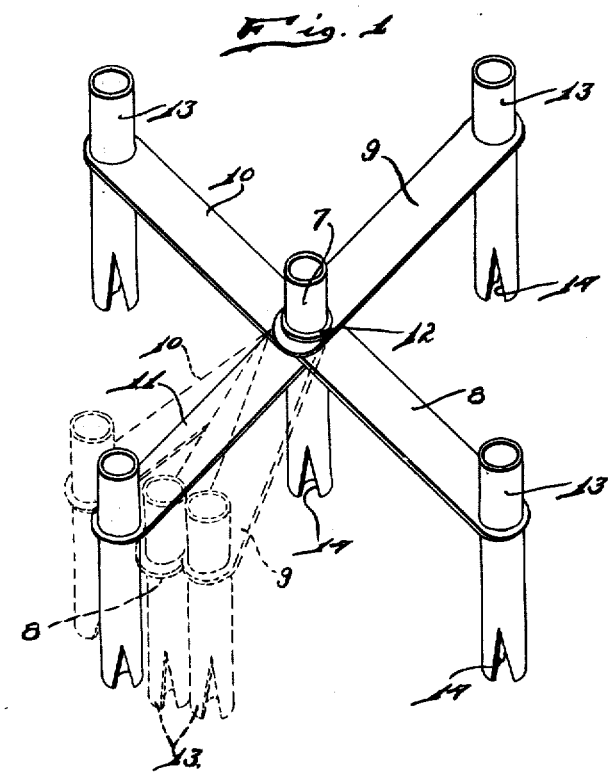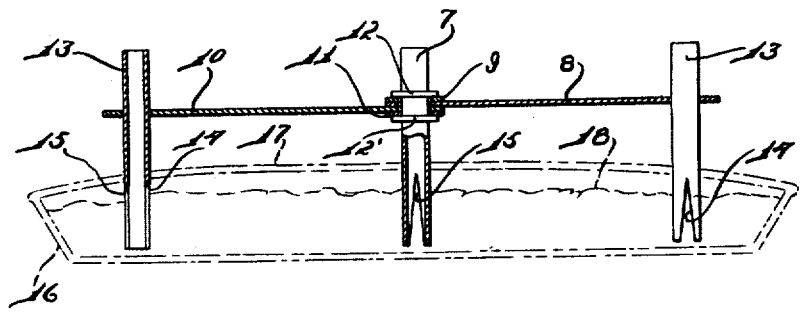

1,738,226

UNITED STATES PATENT OFFICE

EDITH D. BREWER, OF DETROIT, MICHIGAN

PIE VENT

Application filed January 7, 1929. Serial No. 330,854.

My invention relates to a new and useful improvement in a pie vent adapted for use particularly on fruit pies and similar products in which is developed during the baking process, a considerable amount of juice. With fruit pies, it is quite common to experience an overflowing of the juice from a pie resulting in an undesirable appearance of the pie and a messing of the oven in which the pie is baked.

It is an object of the present invention to provide a device which will prevent the overflowing and which will afford a proper escape of vapors generated in the pie.

It is another object of the present invention to provide a pie vent of this class which will be simple in structure, economical of manufacture and highly efficient in use.

Other objects will appear hereinafter.

The invention consists in the combination and arrangement of parts hereinafter described and claimed.

The invention will be best understood from a reference to the accompanying drawing which forms a part of this specification, and in which, Fig. 1 is a perspective view of the invention.

Fig. 2 is a sectional view of the invention illustrating its use.

The invention comprises a central tube 7 swingably mounted on which are radially projecting arms 8, 9, 10 and 11 through which the tube 7 projects adjacent one end, collars 12 and 12' serving to bind the radially projecting arms on the tube 7. These arms 8, 9, 10 and 11 are preferably formed rigid and each carries adjacent its outer end a tube 13 similar to the tube 7. These tubes are each provided at their lower ends with diametrically opposite triangularly formed slits 14 and 15.

In use, the slitted ends of the tubes are projected through the crust 17 of the pie 16 so as to rest on the bottom of the pie. The slits terminate at their upper ends at a point above the level 18 of the filling of the pie and during the baking process, these slits permit the vapors to enter the tubes and escape therefrom, thus relieving the pie of vapor pressure and preventing the over-flowing referred to.

By arranging the device with a central tube 7 and by inserting the tube 7 in substantially the center of the pie, the remaining tubes are located at advantageous points so that the proper venting of the pie in its various parts is effected. By forming the device with the arms rigid, an easy and quick insertion of the vent in the pie becomes possible and by forming the device from metal and similar material, a sanitary structure is afforded. By mounting the arms swingably on the tube 7 when the device is not in use, the arms may be swung into the positions shown in dotted lines in Fig. 1, thus rendering the device compact when stored away. Also, by forming the arm swingable, the device may be adjusted to accommodate pies of varying sizes.

It is of course evident that the slitted ends of the tubes 13 and 7 terminate in the same plane.

While I have illustrated and described the preferred form of my invention, I do not wish to limit myself to the precise detail of structure shown but desire to avail myself of such variations and modifications as come within the scope of the appended claims.

Having thus described my invention, what I claim as new and desire to secure by Letters Patent is:

1. A pie vent of the class described comprising: a tube; a plurality of arms swingably mounted on and projected outwardly from said tube; a tube carried by the free end of each of said arms.

2. A pie vent of the class described comprising: a tube; a plurality of arms swingably mounted on and projected outwardly from said tube; a tube carried by the free end of each of said arms, each of said tubes having one end slitted.

3. A pie vent of the class described comprising: a tube; a plurality of arms swingably mounted on and radiating outwardly therefrom; a tube projected through the free end of each of said arms, each of said tubes being split at one end, said tubes terminating at their slitted end in the same plane.

In testimony whereof I have signed the foregoing specification.

EDITH D. BREWER.